United States Patent [19]

Thomas

[11] Patent Number: 5,020,740
[45] Date of Patent: Jun. 4, 1991

[54] PITCH CONTROL TRIMMING SYSTEM FOR CANARD DESIGN AIRCRAFT

[76] Inventor: Hugh O. Thomas, 4519 Emily Carr Dr., Victoria, B.C., Canada, V8X 2N5

[21] Appl. No.: 500,643

[22] Filed: Mar. 28, 1990

[51] Int. Cl.⁵ .............................................. B64C 17/00
[52] U.S. Cl. ............................. 244/93; 244/45 A; 244/54; 244/75 R; 244/203
[58] Field of Search ............... 244/45 A, 56, 54, 93, 244/75 R, 76 R, 203

[56] References Cited

U.S. PATENT DOCUMENTS

| | | | |
|---|---|---|---|
| 1,355,990 | 10/1920 | Merrill | 244/93 |
| 1,499,943 | 7/1924 | Penn | 244/93 |
| 1,839,563 | 1/1932 | Klingman | 244/93 |
| 1,853,233 | 4/1932 | Schwarz | 244/93 |
| 2,257,940 | 10/1941 | Dornier | 244/56 |
| 2,541,620 | 2/1951 | Stalker | 244/45 A |
| 3,188,022 | 6/1965 | Ornberg | 244/45 |
| 3,926,389 | 12/1975 | Mederer | 244/45 A |
| 3,995,794 | 12/1976 | Lanier | 244/45 A |
| 4,194,708 | 3/1980 | Tracy et al. | 244/15 |
| 4,598,888 | 7/1986 | Beteille | 244/76 R |
| 4,641,800 | 2/1987 | Rutan | 244/45 A |
| 4,746,081 | 5/1988 | Mazzoni | 244/89 |
| 4,848,700 | 7/1989 | Lockheed | 244/45 A |
| 4,899,954 | 2/1990 | Pruszenski | 244/45 A |

FOREIGN PATENT DOCUMENTS

| | | | |
|---|---|---|---|
| 2808017 | 8/1978 | Fed. Rep. of Germany | 244/93 |
| 333101A | 3/1987 | U.S.S.R. | |
| 1107011 | 3/1968 | United Kingdom | |

OTHER PUBLICATIONS

Letter: Comments on Canards–David B. Thurston, Kitplanes, Jul. 1987 Issue, p. 2.

Primary Examiner—Galen Barefoot
Attorney, Agent, or Firm—Townsend and Townsend

[57] ABSTRACT

A pitch control trimming system for a canard design aircraft has the ability to reposition the center of gravity of the aircraft along the longitudinal axis. The design permits trimming of the aircraft without external trim tabs and permits flaps to be used on a canard design aircraft without a nose down or negative pitching moment occurring. The aircraft has a substantial mass associated with the aircraft preferably the power plant including engine and propeller, which is movable substantially along the longitudinal axis of the aircraft, and includes an actuator to move the mass forward and aft on the longitudinal axis to reposition the center of gravity of the aircraft.

17 Claims, 3 Drawing Sheets

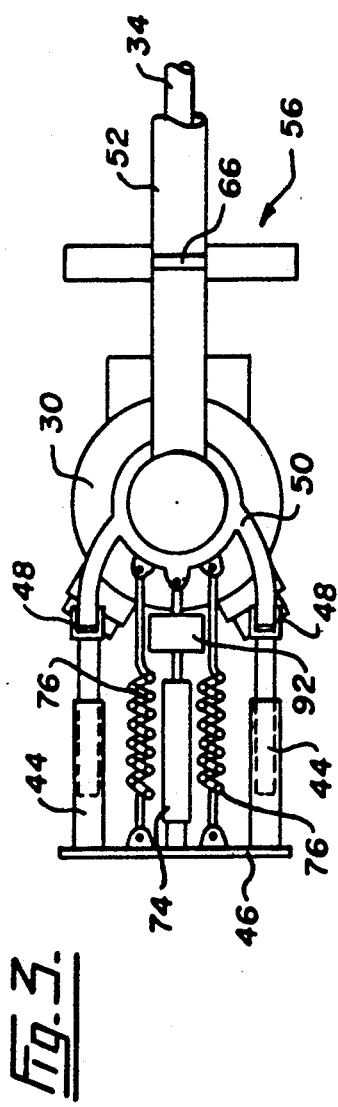
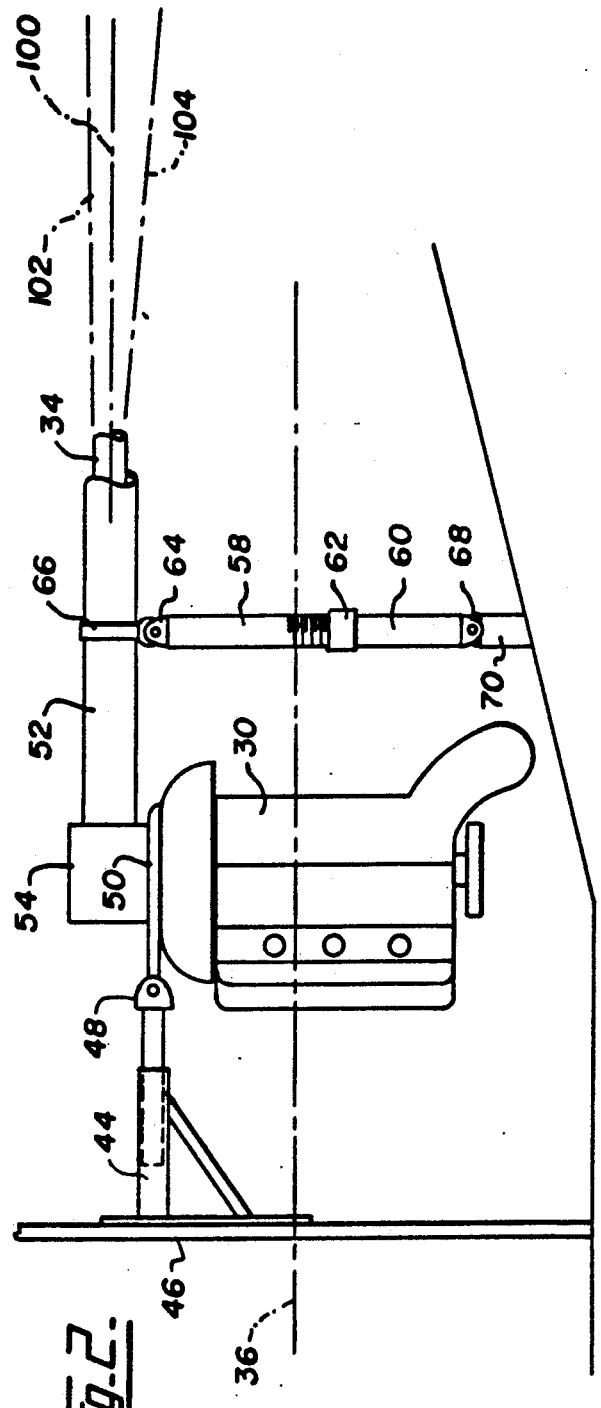

PITCH CONTROL TRIMMING SYSTEM FOR CANARD DESIGN AIRCRAFT

TECHNICAL FIELD

This invention relates to a canard design aircraft, and more specifically to a canard design aircraft having the ability to reposition the center of gravity of the aircraft along the longitudinal axis.

BACKGROUND ART

Aircraft using forward motion of the main wing or wings to achieve lift, must employ a horizontal stabilizer having pivotable control surfaces called "elevators" to control the nose-up or nose-down attitude of the aircraft, otherwise known as the pitching motion of the aircraft. This horizontal stabilizer can be mounted forward or aft of the main wing.

In most conventional aircraft today, the horizontal stabilizer is in the form of the tail assembly and is mounted aft of the main wing. In the canard design aircraft, the horizontal stabilizer in the form of a forward wing is mounted forward of the main wing. The forward wing is called a canard.

Canard design aircraft have been increasing in popularity in recent years as they are, in some respect, safer than conventional aircraft in that they are virtually stall and spin proof.

In conventional aircraft, it is essential that control of the aircraft by the aft tail mounted stabilizer be retained at all times, even though the main wing itself has ceased to provide lift and is in a stall condition. This control can only be achieved by ensuring that the main wing always stalls before the tail mounted stabilizer. In the case of a canard design aircraft, the opposite holds true, and the canard must stall and lose lift before the main wing. In both cases the effect is the same; in a stall, the nose of the aircraft pitches down, restoring lost air speed and regaining lift for the main wing. However, there is a fundamental difference between these two methods of stall recovery. In the case of the aft tail mounted stabilizer, the nose drops because the main wing has stalled. With a canard design aircraft, the canard stalls, causing the nose to drop, but the main wing never stalls. Therefore the canard design aircraft is considered to be far safer because stalls and resulting spins are virtually impossible to initiate. In addition, aside from the safety aspect, canard design aircraft provide the designer with a cleaner more aerodynamic shape to work with for better performance and economy due to the absence of a tail assembly.

One particular type of canard design aircraft has both a canard and an aft tail mounted stabilizer in an attempt to obtain the benefits of both conventional design and canard design aircraft (referred to as a three surface aircraft). The present invention relates primarily to a two surface canard design aircraft, although may be applied to the three surface aircraft.

The foregoing description of the capabilities of canard design aircraft and conventional aircraft apply to conditions during normal flight. In takeoff and landing situations, canard design aircraft are generally considered to have at least one disadvantage when compared to conventional aircraft. It is desirable that speeds for takeoff and landing be as low as possible to allow aircraft to use shorter runways for landing. In order to retain good high speed characteristics and still be able to obtain sufficient lift at low speeds for takeoff and landings, flaps were developed for conventional aircraft. Flaps are pivotally mounted surfaces attached to and forming part of the main wing at the trailing edge. Their purpose is to increase lift at low speeds for take off and landing. When the flaps are lowered, the additional effect is that the center of lift of the main wing moves aft causing a nose down pitching moment. With conventional aircraft, an aft tail mounted stabilizer is designed to retain sufficient authority to control the aircraft when the main wing is stalled, and thus is able to overcome nose down pitching which results from lowering the flaps. In canard design aircraft, the canard is designed to stall before the main wing, with the result that the canard generates lesser lift and is incapable of preventing nose down pitching of the aircraft when the center of lift moves aft with deployment of the flaps. Therefore it is generally accepted that a canard designed aircraft cannot be fitted with flaps. Thus take off and landing speeds for canard design aircraft are higher than most conventional aircraft fitted with flaps.

DISCLOSURE OF INVENTION

Accordingly, there exists a need for a canard design aircraft that can safely be fitted with flaps to provide lower takeoff and landing speeds. The present invention provides a canard design aircraft that has the ability to reposition the center of gravity of the aircraft along the longitudinal axis. Thus, when flaps on the main wing are lowered, the center of lift of the main wing moves aft and at the same time a system is provided to move the center of gravity of the aircraft aft on the longitudinal axis to prevent a nose down pitching moment. Furthermore, movement of the center of gravity along the longitudinal axis may be used for trimming the aircraft for different flight conditions without external trim tabs on elevators that cause drag.

The present invention also provides in one embodiment a canard design aircraft of the pusher type wherein the aircraft engine represents a mass than can be moved forward and aft on the longitudinal axis of the aircraft. In another embodiment there is a pressure sensor positioned to measure the thrust of the engine and provide the pilot with an indication of engine thrust during flight or static conditions.

A still further advantage of the present invention is to provide a canard design aircraft of the pusher type with an aft propeller driven by a rotating shaft defining a thrust axis, and an adjustment system to vary the incidence of the thrust axis.

The present invention provides a canard design aircraft having a canard and a rear main wing, wherein a substantial mass associated with the aircraft is movable substantially along the longitudinal axis of the aircraft, and including actuating means to move the substantial mass forward and aft on the longitudinal axis to reposition the center of gravity of the aircraft.

In another embodiment there is provided a canard design aircraft having a canard and a rear main wing, the aircraft having a pitch control trimming system comprising movable flaps pivotally mounted to the rear main wing, adapted to provide additional lift at takeoffs and landings; a substantial mass supported in the aircraft by a movable mounting means adapted to allow for forward and aft movement of the mass substantially along the longitudinal axis of the aircraft; first actuating means for moving the mass on the movable mounting means forward and aft along the longitudinal axis of the aircraft; movable flaps pivotally mounted on the rear main wing adapted to provide additional lift at takeoff and landing; second actuating means to raise and lower the flaps, and means interconnecting the first actuating means and the second actuating means whereby when the flaps are lowered with respect to the rear main wing, the mass is moved aft along the longitudinal axis to move the center of gravity of the aircraft aft, and when the flaps are raised to an aligned position with respect to the rear main wing for normal flight, the mass is moved forward along the longitudinal axis.

In a still further embodiment there is provided a canard type aircraft having a canard, a rear main wing with flaps, and an engine, the aircraft having a pitch control trimming system comprising engine mounting means adapted to allow forward and aft movement of the engine substantially along the longitudinal axis, first actuating means to move the engine forward and aft along the longitudinal axis; second actuating means to raise and lower the flaps on the rear main wing, and interconnecting means between the first actuating means and the second actuating means to move the engine aft when the flaps are lowered for counteracting nose down pitching moment caused by lowering the flaps.

BRIEF DESCRIPTION OF DRAWINGS

In drawings which illustrate embodiments of the invention,

FIG. 2 is a detailed side view of an engine mounting arrangement according to one embodiment of the present invention.

FIG. 3 is a plan view of the engine mounting arrangement shown in FIG. 2.

BEST MODE OF CARRYING OUT THE INVENTION

Figure 1:
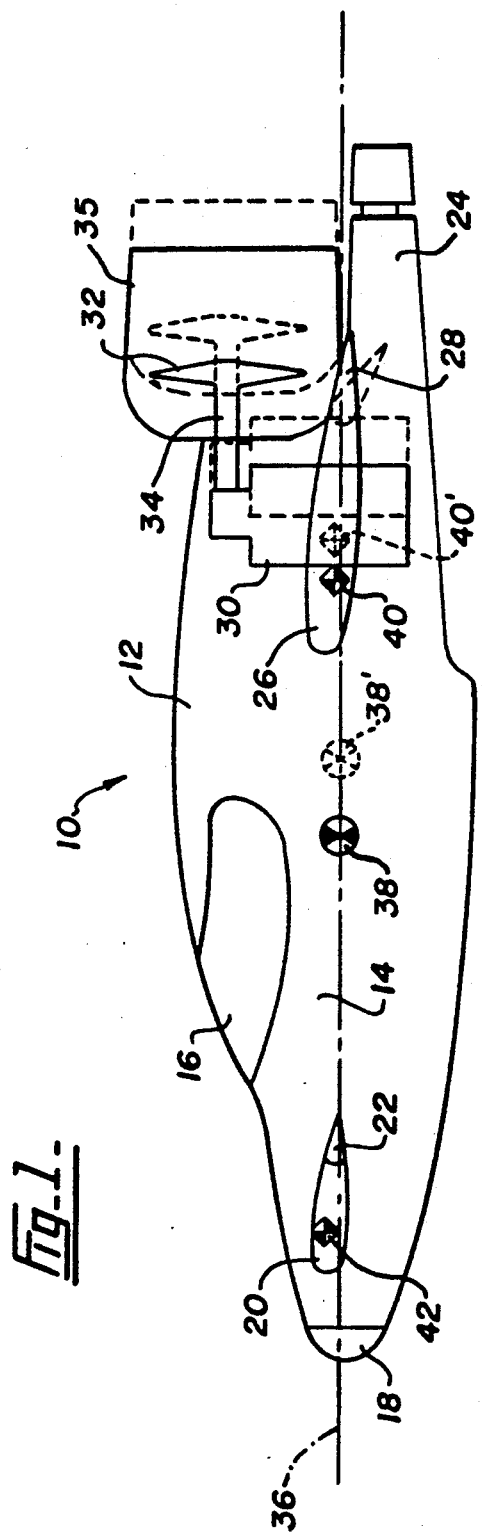
FIG. 1 is a side schematic view of a canard design aircraft according to one embodiment of the present invention.

Referring now to the drawings, a canard design aircraft 10 is shown in FIG. 1 with a pitch control trimming system according to one embodiment of the present invention. The aircraft comprises an aerodynamic fuselage 12 with a cockpit 14 having a windshield 16 for housing the pilot and passengers. Adjacent the nose 18 of the aircraft, there is a canard 20 comprising an air foil section equipped with movable elevator control surfaces 22 that are provided to control pitching moment of the aircraft during normal flight conditions. Towards the aft or tail end 24 of the aircraft there is a main wing 26 equipped with pivotally mounted movable flaps 28. These flaps 28 provide additional lift at low flying speeds and are used for takeoff and landing.

The power plant assembly includes an engine 30 mounted in the fuselage 12 towards the tail end 24 of the aircraft. The engine 30 is a conventional aircraft engine adapted to drive an aft propeller 32 mounted externally of the fuselage on a propeller shaft 34. Thus the aircraft 10 is a pusher type. The propeller 32 is surrounded by a duct 35 or shroud which enhances static thrust for maximum takeoff performance.

The aircraft 10 has a longitudinal axis 36 about which the fuselage rolls when making turns during flight. In addition the aircraft 10 has a center of gravity 38 on the longitudinal axis 36 located at a point through which the weight of the aircraft is considered to act. Main wing 26 has a center of lift which is located at a point 40 where the lift generated by the main wing 26 is considered to act. When the flaps 28 are lowered, the center of lift 40 moves aft to a location shown in FIG. 1 as 40'. The canard 20 also generates a lift and has a center of lift 42. The lift force generated by the canard 20 is relatively small when compared with the lift generated by the main wing 26.

In conditions of flight in any aircraft, the relationship between the center of gravity and the center of lift is critical. The center of gravity must always be forward of the center of lift. Control and equilibrium of an aircraft can be exercised by adjusting the magnitudes of the lift force and the distance between the center of lift and the center of gravity. Up until the present time, control and equilibrium of an aircraft has been accomplished in flight by varying the magnitude of the lift force and moving the center of lift through manipulation of flight control surfaces.

The pitch control trimming system of the present invention allows for pitch control and equilibrium of a canard type aircraft by providing for movement of the center of gravity of the aircraft. This is accomplished by providing the aircraft with a substantial mass supported in the aircraft fuselage 12 by a movable mounting system adapted to allow forward and aft movement of the mass substantially along the longitudinal axis 36 of the aircraft 10. In the embodiment shown the substantial mass comprises the power plant assembly including the engine 30, propeller 32 and shroud 35, mounted towards the rear of the aircraft 10. The pitch control system comprises elevators 22 pivotally attached to the trailing edge of the canard 20. The pitch control trimming system comprises moving the power plant assembly forward and aft on the longitudinal axis 36 to provide aircraft trim. The movable mass to vary the center of gravity of the aircraft need not be limited to the power plant assembly but may be any suitable large mass mounted in or associated with the aircraft fuselage 12 that can be moved forward and aft substantailly along the longitudinal axis 36, or arranged in such a manner that the center of gravity of the aircraft moves along the longitudinal axis 36. As the power plant assembly provides a suitable large mass, it is preferred for most small canard design aircraft.

The power plant assembly being movable on the longitudinal axis 36 provides two distinct advantages for a canard design aircraft 10. In the first place the power plant assembly can be moved forward and aft to trim the aircraft 10 for different flight conditions without adding additional aerodynamic drag caused by trim tabs. When the aircraft is ascending, it is trimmed nose up and the center of gravity 38 is moved closer to the center of lift 40. The center of gravity 38 is moved away from the center of lift 40 to achieve nose down altitude. This also provides the pilot with a positive method of keeping the aircraft center of gravity 38 within its center of gravity range during all flight conditions.

The second feature of the present invention is to provide a pilot with adequate control over the pitch stability in the aircraft 10 when main wing flaps 28 are lowered. This is accomplished by moving the power plant assembly aft while the flaps 28 are being lowered to create a positive moment equal to the negative moment produced by the lowered flaps 28. These actions result in constant stick pressures for the pilot as the flaps 28 are lowered. If the center of gravity 38 is not adjusted, the lift generated by the elevator 22 on the canard 20 is not sufficient to counteract the negative pitching moment produced by the lowered flaps 28.

Referring now to FIGS. 2 and 3, there is shown a movable mounting arrangement wherein the power plant assembly is a conventional piston engine 30. The engine 30 is supported by two front mount members 44 that are elongatable substantially along the longitudinal axis 36 of the aircraft 10. The front mount members 44 are telescopic and extend between a rigid connection to a main bulkhead 46 and a front pivot connection 48 on the mounting bracket 50 which engages the engine 30. The propeller shaft 34 rotates in a propeller shaft housing 52 extending aft from a gear box 54 positioned at the top of the engine 30. The rear mount member 56 is elongatable about an axis substantially perpendicular to the longitudinal axis 36. The rear mount assembly 56 has an upper tube 58 which telescopes into a lower tube 60. A screw jack 62 electrically operated, extends and contracts the rear mount assembly 56 by telescoping the upper tube 58 into the lower tube 60. The upper tube 50 has a pivot position 64 at the top connecting to a clamp ring 66 which is firmly clamped to the propeller shaft housing 52. The lower tube 60 has a pivot position 68 at its base attached to a rigid lower support member 70 extending transversely across the aircraft fuselage 12. The screw jack 62 provides the ability to lengthen and shorten the rear mount assembly 56 between the two pivot positions 64 and 68. This takes into account movement forward and aft of the motor 30 by means of the front mount members 44. A front actuator 74, which in the embodiment shown is a double acting hydraulic cylinder with a movable piston therein, is interposed between the main bulkhead 46 and the mounting bracket 50 of the engine 30. The actuator 74 pushes the engine 30 aft, substantially along the longitudinal axis 36 towards the tail 24 and also acts to hold the engine 30 in position against the thrust generated by the propeller 32. Associated with the actuator 74 are springs 76 which assist in displacing the engine 30 along the longitudinal axis towards the nose 18. In one embodiment, the hydraulic actuator 74 is double acting thus movement of the engine 30 in both directions relative to the main bulkhead 46 is controlled completely by the hydraulic actuator 74. The springs 76 generally act in event of hydraulic failure to move the engine 30 forward to the forward position. In another embodiment the hydraulic actuator 74 is only single acting and pushes the engine 30 aft. The movement of the engine forward is primarily caused by thrust from the propeller 32.

In one embodiment the screw jack 62, is a worm gear, electrically driven, and extends or reduces the distance between the two pivot positions 64 and 68. If the distance between the pivot positions is increased then a pivoting action occurs about the front pivot connection 48 and the power plant assembly including the motor 30 together with propeller shaft 34 tilts upwards. This results in the thrust axis 100 of the propeller having the angle of incidence increased. If the distance between the two pivot positions 64 and 68 is reduced, then the angle of incidence of the thrust axis 100 is reduced. This allows the pilot to adjust the incidence of the thrust axis 100 during all flight and static conditions.

Figure 4:
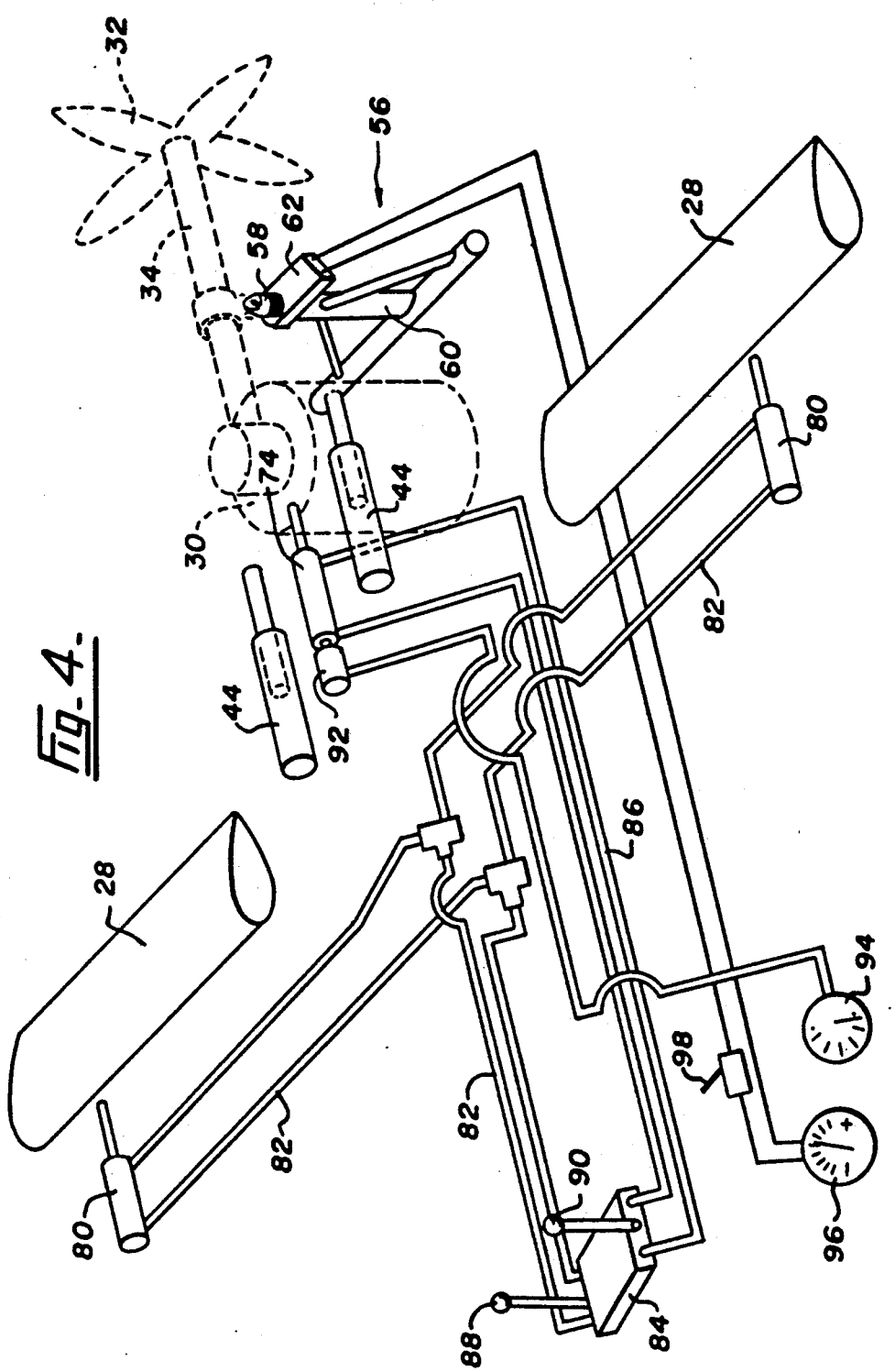
FIG. 4 is a schematic view showing the hydraulic line connections for the actuator to move the power plant forward and aft along the longitudinal axis and the actuators to raise and lower the flaps.

FIG. 4 shows how various components of the pitch control trimming system of the present invention fits together. Port and starboard flaps 28 are operated by flap actuators 80 connected by hydraulic lines 82 to a sequencing valve 84. The engine actuator 74 moves the engine 30 forward or aft and is connected by hydraulic lines 86 to the sequencing valve 84. Both the flap actuator 80 and the engine actuator 74 are double acting hydraulic actuators and are powered in both directions by means of the hydraulic lines 82 and 86.

The sequencing valve 84 is positioned adjacent the cockpit and a flap control lever 88 is provided to select flap position by lowering and raising the flaps 28 by means of the flap actuators 80. At the same time that the flaps 28 are moved, the sequencing valve 84 ensures that the hydraulic system operates the engine actuator 74 to move the engine 30 either forward or aft in accordance with the movement of the flaps 28. The sequencing valve 84 is provided with hydraulic circuitry so that the control lever 88 provides a flap movement of about 8 to 10% authority, before the engine actuator 74 commences to move the engine power plant. When the flaps 28 are lowered, the power plant including the engine 30 moves aft along the longitudinal axis 36 and when the flaps 28 are raised, the power plant including the engine 30 moves forward.

As seen in FIG. 1 the forward and aft movement of the engine 30 effects the center of gravity 38 of the aircraft 10. When the power plant assembly is moved aft the center of gravity 38 moves to point 38'. When the flaps 28 are lowered, the center of lift 40 of the main plane 26 moves aft to a position 40'. This prevents forward pitching of the aircraft when the flaps 28 are lowered. In the embodiment shown, the power plant assembly includes the engine 30, propeller 32 and shroud 35. When the flaps 28 are raised, the procedure is reversed. The sequencing valve 84 is provided with hydraulic circuitry so that after a flap movement of about 8 to 10% authority, the engine actuator 74 commences to move the power plant forward. This moves the center of lift forward.

For trimming the aircraft, trim lever 90 on the sequencing valve 84 is provided. The trim lever 90 ensures that the engine actuator 74 is activated so that the engine 30 moves forwards and aft to trim the aircraft 10. As in the case of the flap control lever 88, the trim lever 90 operates the sequencing valve 84 so that there is an engine movement on the longitudinal axis of about 8 to 10% authority. Movement of the engine 30 aft beyond this, results in the flaps 28 being lowered. Thus the sequencing valve 84 provides slight movement of the flaps 28 or the engine 30, but then moves the two together to ensure stability of the aircraft. The trim control does not effect drag associated with conventional trim tabs.

Whereas a sequencing valve 84 is illustrated with a hydraulic system, this may be replaced by other suitable control arrangements such as electrical actuators and interlocks or other mechanical equivalents.

A pressure sensor 92 is provided in association with the engine actuator 74 and, as shown in FIG. 2 is positioned engine 30. A pressure gauge 94 is positioned in the cockpit with the gauge calibrated to show thrust generated by the propeller 32 to determine the thrust between the engine 30 and the main bulkhead 46 of the aircraft 10. An indication of thrust allows the pilot to determine the output of the engine 30 during flight or static conditions.

For the specific embodiment illustrated in FIG. 2 the engine movement is approximately four inches, and if the rear mount member 56 is a fixed distance between pivot points 64 and 68 there is a variation in the incidence of the thrust axis of about half a degree. This incidence can be increased or reduced by utilizing the motorized worm gear 62 to change the distance between the two pivot points 64 and 68 for the rear mount member 56. A gauge 96 is positioned in the cockpit as shown in FIG. 4 with a control switch 98 to allow the pilot to vary the incidence of the thrust axis 100. The incidence of the thrust axis 100 may be varied between the limits defined by dash lines 102 and 104 about thrust axis line 100. Thus, the pilot is able to ensure that the thrust axis 100 is at an optimal angle for any flight condition.

Various changes may be made to the embodiments shown herein without departing from the scope of the present invention which is limited only by the following claims.

What is claimed is:

1. A canard design aircraft having a canard and a rear main wing, comprising: a power plant associated with the aircraft movable substantially along the longitudinal axis of the aircraft; an actuating means for moving the power plant forward and aft on the longitudinal axis to reposition the center of gravity of the aircraft; and
   means coupled to said rear main wing and to said actuating means, for activating said actuating means when said rear main wing is reconfigured.

2. A canard design aircraft according to claim 1 wherein trim control of the aircraft is carried out by moving the power plant on the longitudinal axis.

3. The canard design aircraft according to claim 1 wherein the power plant is of the pusher type, and wherein the power plant is supported within the aircraft by at least one support member from a bulkhead of the aircraft, the member elongatable to move the power plant substantially along the longitudinal axis.

4. The canard design aircraft according to claim 3 including sensing means associated with the support member for providing an indication of thrust between the power plant and the bulkhead of the aircraft.

5. The canard design aircraft according to claim 1 wherein the actuating means comprises a double acting hydraulic operated piston in a cylinder.

6. A canard design aircraft having a canard and a rear main wing, comprising: a power plant associated with the aircraft movable substantially along the longitudinal axis of the aircraft; an actuating means for moving the power plant forward and aft on the longitudinal axis to reposition the center of gravity of the aircraft;
   movable flaps pivotally mounted to the rear main wing, adapted to provide additional lift and move the center of lift of the rear main wing aft;
   second actuating means to raise and lower the flaps; and
   means interconnecting with the actuating means to move the power plant and the second actuating means whereby when the flaps are lowered, the power plant is moved aft substantially along the longitudinal axis to move the center of gravity of the aircraft aft.

7. A canard design aircraft having a canard and a rear main wing, the aircraft having a pitch control trimming system comprising:
   movable flaps pivotally mounted to the rear main wing, adapted to provide additional lift at takeoff and landings;
   a power plant supported in the aircraft by a movable mounting means adapted to allow for forward and aft movement of the power plant substantially along the longitudinal axis of the aircraft;
   first actuating means for moving the power plant on the movable mounting means forward and aft along the longitudinal axis of the aircraft;
   second actuating means to raise and lower the flaps; and
   means interconnecting the first actuating means and the second actuating means whereby when the flaps are lowered with respect to the rear main wing, the power plant is moved aft along the longitudinal axis to move the center of gravity of the aircraft aft, and when the flaps are raised and aligned position with to the rear main wing for normal flight the power plant is moved forward along the longitudinal axis.

8. the canard design aircraft as claimed in claim 7 in which said means interconnecting the first actuating means and the second actuating means comprises a hydraulic system.

9. A canard design aircraft having a canard and a rear main wing, the aircraft having a pitch control trimming system comprising:
   movable flaps pivotally mounted to the rear main wing, adapted to provide additional lift at takeoff and landings;
   a power plant supported in the aircraft by a movable mounting means adapted to allow for forward and aft movement of the power plant substantially along the longitudinal axis of the aircraft;
   first actuating means for moving the power plant on the movable mounting means forward and aft along the longitudinal axis of the aircraft;
   second actuating means to raise and lower the flaps;
   means interconnecting the first actuating means and the second actuating means whereby when the flaps are lowered with respect to the rear main wing, the power plant is moved aft along the longitudinal axis to move the center of gravity of the aircraft aft, and when the flaps are raised and aligned position with to the rear main wing for normal flight the power plant is moved forward along the longitudinal axis; and
   wherein the movable mounting means comprises:
      (i) at least one front mount member that is elongatable substantially along the longitudinal axis, and pivotally connected at one end to a front end of the power plant, and at the other end to a main bulkhead of the aircraft, and
      (ii) at least one rear mount member that is elongatable along an axis substantially perpendicular to the longitudinal axis, and pivotally connected at the other end to a further bulkhead of the aircraft.

10. The canard design aircraft as claimed in claim 9 in which the front mount member is telescopic.

11. The canard design aircraft as claimed in claim 9 in which the first actuating means comprises a double acting hydraulic actuator interposed between the main bulkhead of the aircraft and the power plant.

12. The canard design aircraft as claimed in claim 11 including sensing means associated with the hydraulic actuator for determining thrust generated by the power plant, the sensing means comprising a calibrated pressure sensor mounted between the main bulkhead and the power plant.

13. The canard design aircraft as claimed in claim 9 wherein the power plant comprises an engine mounted at the rear of the aircraft and drives an aft propeller through a rotating shaft that defines a thrust axis.

14. The canard design aircraft as claimed in claim 13 including adjustment means to vary incidence of the thrust axis.

15. The canard design aircraft as claimed in claim 14 wherein the rear mount member is telescopic and has a threaded telescoping section, the adjustment means to vary the incidence of the thrust axis being associated with the rear mount member, and comprising a worm gear for engaging the threaded telescopic section in order to elongate the rear mount member to vary the incidence of the thrust axis.

16. A canard type aircraft having a canard, a rear main wing with flaps, and an engine, the aircraft having a pitch control trimming system comprising:
    engine mounting means adapted to allow for forward and aft movement of the engine substantially along the longitudinal axis;
    first actuating means to move the engine forward and aft along the longitudinal axis;
    second actuating means to raise and lower the flaps on the rear main plane, and
    interconnecting means between the first actuating means and the second actuating means to move the engine aft when the flaps are lowered for counteracting nose down pitching moment caused by lowering the flaps, and to lower the flaps when the engine is moved aft for trimming the aircraft.

17. A canard type aircraft having a canard, a rear main wing with flaps, and an engine, the aircraft having a pitch control trimming system comprising:
    engine mounting means adapted to allow for forward and aft movement of the engine substantially along the longitudinal axis;
    first actuating means to move the engine forward and aft along the longitudinal axis;
    second actuating means to raise and lower the flaps on the rear main plane;
    interconnecting means between the first actuating means and the second actuating means to move the engine aft when the flaps are lowered for counteracting nose down pitching movement caused by lowering the flaps, and to lower the flaps when the engine is moved aft for trimming the aircraft; and
    wherein the first actuating means and the second actuating means both have about 8 to 10% authority before the interconnecting means applies.

* * * * *